Figure 2:
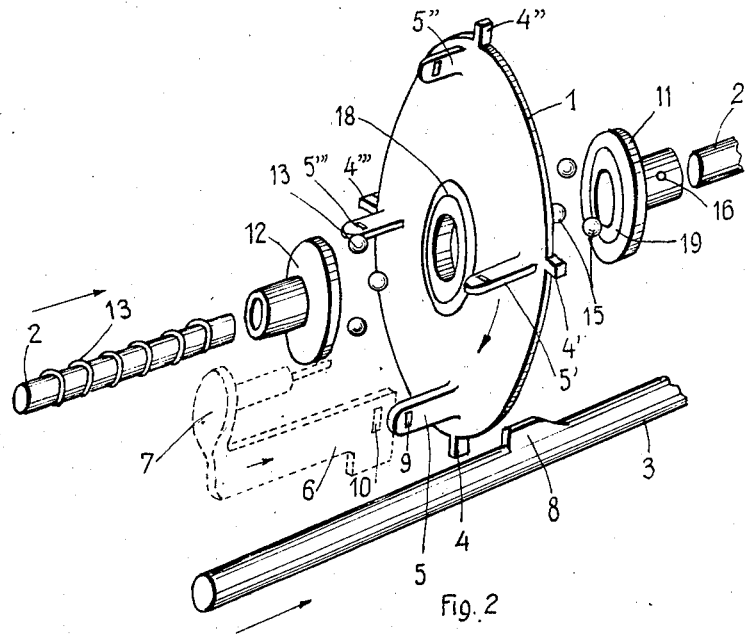

May 3, 1949.  R. GOURDON  2,469,035
ELECTROMECHANICAL DEVICE FOR GOVERNING
PREDETERMINED CHANGES OF POSITIONS
Filed Jan. 15, 1947  3 Sheets-Sheet 1

Robert Gourdon
INVENTOR
By George H. Corey
His Attorney

May 3, 1949.  R. GOURDON  2,469,035
ELECTROMECHANICAL DEVICE FOR GOVERNING
PREDETERMINED CHANGES OF POSITIONS
Filed Jan. 15, 1947  3 Sheets-Sheet 2

Robert Gourdon
INVENTOR

By George H. Corey

His Attorney

May 3, 1949.　　　　R. GOURDON　　　　2,469,035
ELECTROMECHANICAL DEVICE FOR GOVERNING
PREDETERMINED CHANGES OF POSITIONS
Filed Jan. 15, 1947　　　　　　　　3 Sheets-Sheet 3
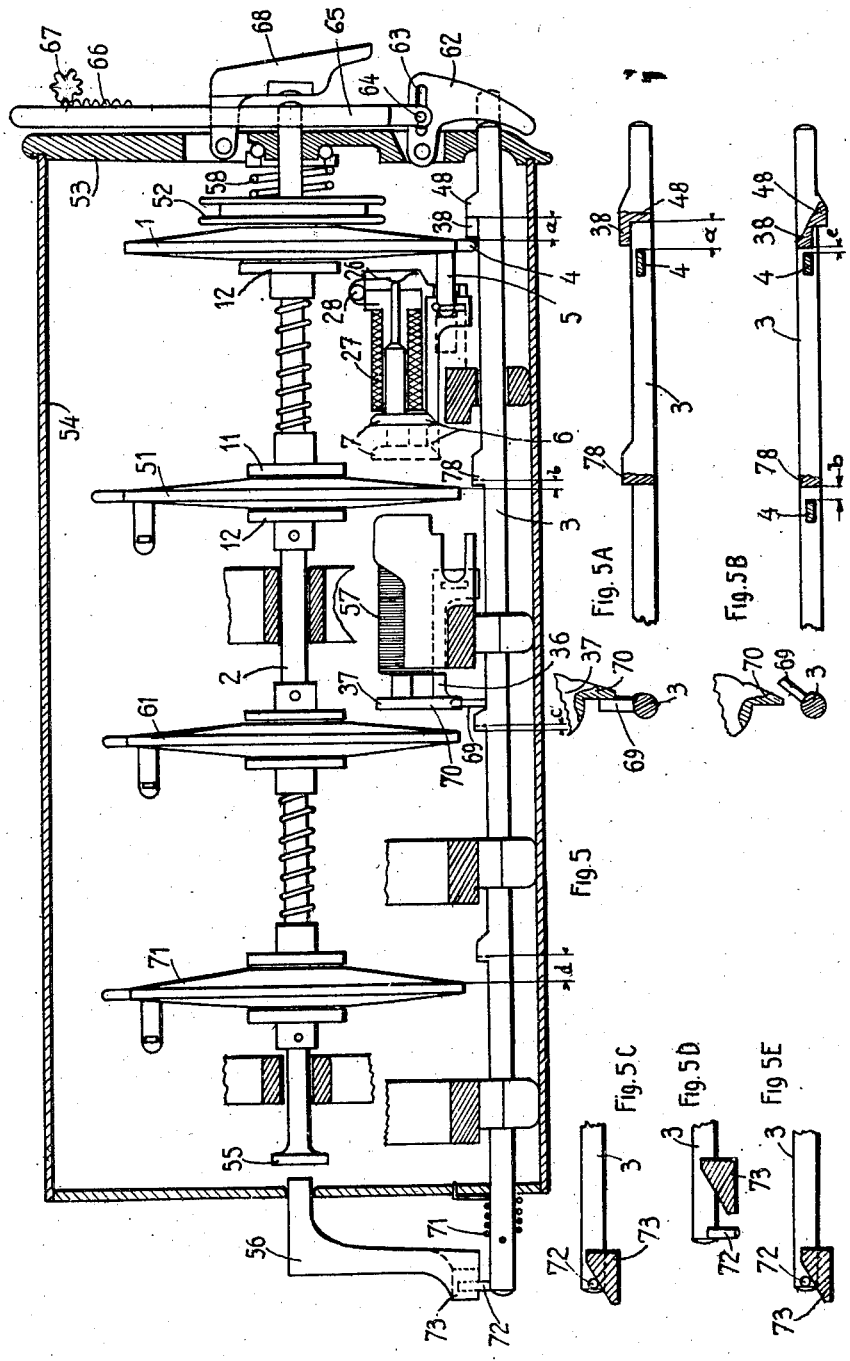
Robert Gourdon
INVENTOR
By George H. Corey
His Attorney Patented May 3, 1949

2,469,035

UNITED STATES PATENT OFFICE 2,469,035

ELECTROMECHANICAL DEVICE FOR GOVERNING PREDETERMINED CHANGES OF POSITION

Robert Gourdon, Paris, France, assignor to Centre d'Etudes M. B. A. (Mecanique, Balistique, Armement), Paris, France Application January 15, 1947, Serial No. 722,196
In France January 16, 1946

10 Claims. (Cl. 74—110)

My invention has for its object the provision of electro-mechanical devices for the governing of predetermined movements of moving parts, for instance translational motions of spindles and rods, as well as the application of such governing devices to the establishment of electromechanical controllers capable of actuating several parts selectively as much in regard to number and position as to the magnitude of movement, by means of a single governing operation initiated by a selective control operation.

It has as its more special object the provision of such devices and controllers in such a way that the controlling or initiating energy for governing, may be very weak and of very short duration; the governing energy, itself, also of momentary application, may be more considerable and drawn on a different supply, and this may be so, without the moments of application of these two energies necessarily exhibiting a predetermined relation fixed, for instance, in the case where such devices and controllers have to be remotely governed; the controlling force is transmitted conveniently, since it is weak, from remote stations, while the force required for the governing operation itself, that may be considerable by comparison, is drawn on a local supply, possibly under the control of signals transmitted from remote stations. For instance also, in the case where the working of the devices and apparatus is done locally, but is subjected to the control of semi-automatic operations, the governing force will be supplied by an operator who supervises and directs the working of the system incorporating the devices and various gear.

The electro-mechanical devices considered in the invention include a rotary driving shaft arranged in parallel with the rod, spindle or the like member of which it is desired to govern the change of position; this shaft carries at least one plate or disc that shows at least one stop capable of interlocking with the armature or plunger of an electro-magnet when the latter is temporarily energized and thus stopping the plate in a predetermined position with reference to the part to be governed; this same stop, or another one carried by the plate in suitable relationship with the first one, but on the periphery, is then checked in a relative position with reference to the part to be governed; consequently a further translational motion of the driving shaft imparts a translational motion to the part to be governed of which the amplitude is preadjusted by the locations corresponding to the check of the cooperating stops.

By arranging, in accordance with another feature of the invention, along the length of the driving shaft, several discs, that can work together with electro-magnets and stops on the part to be governed, in suitable relationship, the selection carried out by energization of one of the electro-magnets allows for a translation motion, always of the same extent, of the driving shaft, the initiation of translational motions of different amplitudes for the part to be governed, according to the comparative differences of clearance between the driving stop carried by each disc and the cooperating stop of the part to be governed. Provision has also been made, according to another feature of the invention for obtaining several different amplitudes with the same stop of a disc, by giving the stop of the part to be governed a special shaped projecting outline of which the different surfaces may be brought to work together with the stop of the disc by means of a pre-selective rotation of the part to be governed; here again, this pre-selection is put under the control of an electro-magnet, conveniently one of the electro-magnets available, but the force required for rotation is supplied by a local source controlled by the electro-magnet, for instance by a spring against the action of which the part to be governed is locked in its inoperative condition.

By arranging, according to still another feature of the invention, several parts to be governed around a driving shaft with multiple discs, with the required electro-magnets associated with each of the parts, the invention allows producing extremely compact electro-mechanical controllers.

In this latter case, it is of advantage to provide several stops or pairs of stops on each disc, in order to lessen the amplitude of the required rotations. Care only must be taken that the distribution of these stops around the periphery does not coincide with the distribution of the parts to be governed around the driving shaft.

A further object of the invention consists in the setting of the discs on the driving shaft by means of a pressure friction drive, becoming, at the stop of one of the discs, a rolling friction, in such a way that the stopping of a disc by a selective electro-magnet does not cause the stopping of the shaft and of the other discs that it carries and this in order to allow on the one hand simultaneous selections bearing on several parts to be governed and on the other hand a substantial increase of the sensitiveness of the system.

It has been pointed out that the driving shaft was rotating, but it is plain that this shaft may either rotate in a continuous manner or be driven only when a selection takes place. At the same time, it has been shown that each disc exhibited two stops per part to be governed, one working together with the electro-magnet, the other with the said part, or a single stop suitably shaped and arranged in order to play both parts. It is manifest however that the provision of discs of which the components form themselves the stops for instance through a cam-shaped periphery or thickness is also possible according to the invention.

What is more, it is plain that the invention obviously covers the case where the governed parts act only as agents for the governing of other parts of which the movements desired may besides be other than translational motions, for instance turning motions. In such cases, the parts governed serve for actuating mechanisms, well known per se, for the conversion of movement, that preserve the amplitudes, or alter them in predetermined manner for all the parts.

Figure 1A:
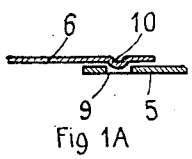
Figure 1:
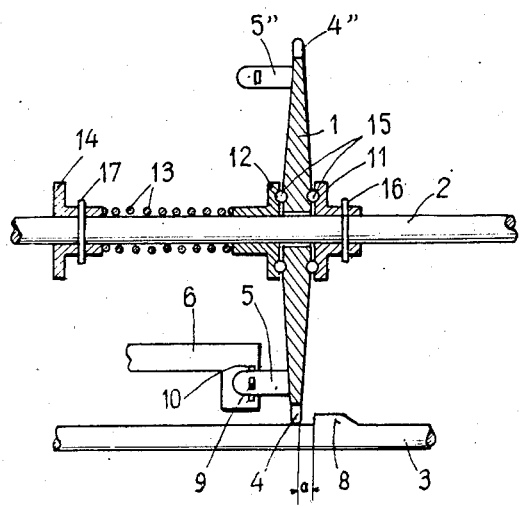

As an illustration of the features mentioned above, a concrete example will now be described with reference to the accompanying drawings that show:

In Figure 1 a side view partly in section of a device or part of controller.

In Figure 1A, the detail of the connection between the blade of an electro-magnet and a disc stop.

In Figure 2 an exploded view, in perspective, of the dismantled device of Figure 1.

Figure 3:
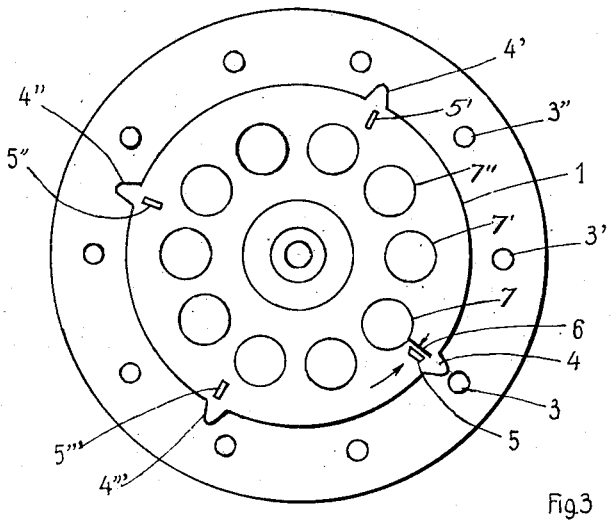

In Figure 3 a diagrammatic plan view of a controller employing a governing disc for the movement of ten rods arranged according to the generating lines of a cylinder.

Figure 4:
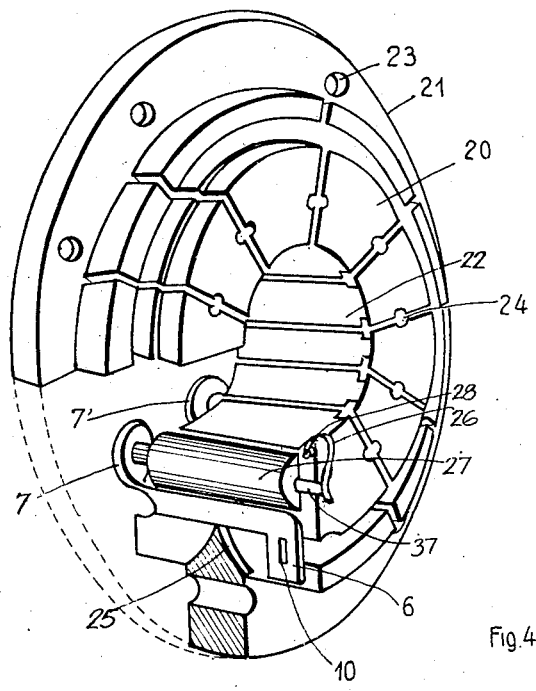

In Figure 4 a view in perspective of an example of frame for the controller of Figure 3, and In Figure 5, a side view, partly in section of an electro-magnetic controller with several discs of which Figures 5A to 5E give detail diagrams for explaining the operation.

In Figures 1 and 2, the plate or disc 1 is set on the driving shaft 2 and can change its position through rotation and translational motion in the directions shown by arrows.

The driving shaft 2 is arranged in parallel with the part to be governed, appearing under the shape of a rod 3 that is to change position axially in the direction shown by the corresponding arrow. The disc 1 carries at its periphery at least one stud 4, and on one of its faces at least one stop or small corresponding plate 5. In the example illustrated, the disc 1 carries four sets of studs and stops (4—5, 4'—5', 4"—5" respectively) in order to lessen the rotation necessary for one of the stops 5 to engage the blade 6 of plunger 7 of an electro-magnet (not shown) when this electro-magnet, located so as to check a stop 4 in alignment with a boss 8 of the rod 3, is energized. Each small plate 5 is provided with a slot 9 in such a way that it can catch on a rib 10 of the blade 6 of the electro-magnet. Figure 1A shows in section the detail of this catch arrangement; thus, a momentary energization of the electro-magnet will be enough to cause the stoppage of the disc 1 in a suitable position, and the electro-magnet circuit may be switched off, without the blade returning to its inoperative position owing to the mechanical locking provided.

With the change of position of the rod 3 thus prepared it will be necessary, for making the control effective, to impart a translational motion to the shaft 2 that drives the disc 1 and, through the engagement of the stud 4 with the boss 8, starts the driving of the rod 3.

It must be observed that the forward motion of the disc 1 releases the blade 6 of the electro-magnet with reference to the stop 5. The blade of the electro-magnet returns to its inoperative position and the disc 1 could turn if, for this speedy change of position, the stud 4 was not engaged with boss 8. The setting together of the surfaces of the stud and boss moreover may be provided to advantage in a manner such that it may provide a certain degree of interlocking; for instance, as shown in the drawing the stud 4 may have its front face projecting and the boss 8 its face correspondingly recessed. The amplitude of the translational motion of the rod 3 is fixed for a predetermined translational movement of shaft 2 and is equal to the latter movement, less the clearance $a$ that remains between the stud 4 and the boss 8 when inoperative.

The disc 1 obviously could be fastened on the shaft 2. However, in order to allow the shaft to carry on its rotary movement in spite of the possible stoppage of the disc, it may be set loose on shaft 2 and driven by pressure-friction. An example of such a setting is illustrated in the drawing. The disc 1 is placed between two blocks of which one 11 is fastened for instance by a key 16 on the shaft 2, while the other 12 is forced by a taut spring 13 held between the block 12 and another block 14 keyed at 17 on the shaft. Balls 15 are inserted between the blocks 11, 12 and disc 1, inside suitable grooves of these members, such as can be seen at 18 on the disc and at 19 on block 11, in the exploded view of Figure 2.

The disc, according to another feature of the invention, may cooperate with a certain number of rods 3, a special electro-magnet being allotted for the control of each of the rods 3, the rods and electro-magnets then being distributed concentrically, as shown in the plan view of Figure 3, at 3—7, 3'—7', 3"—7", etc. In this case, the studs 4 . . . 4''' should be laid out on the periphery of the disc 1 with an irregular angular distribution, so that the stoppage of the disc by one of the electro-magnets only control the change of position of a single rod 3. This is illustrated in Figure 3.

Figure 4 gives, in cut off perspective view an example of a frame to carry the electro-magnets and the rods of a controller established according to the arrangements of Figures 1 to 3. This fixed frame is of a non-magnetic metal cast for instance in a general circular shape and bored out at the centre at 22 to take the shaft 2. In its peripheral ring 21 holes 23 are drilled to take the rod 3. The electro-magnets 27 are housed in transversal recesses ended off on the front face (as shown in the figure) by bores taking the ends 37 of the plungers 7 of the electro-magnets.

The blades 6 of these electro-magnets are arranged radially, in alignment with the directing holes 23, in slots 24 obtained for instance by cutting out the frame with a saw, two saw-cuts cooperating, as may be seen at 25 in the lower part of the figure, to form these slots. Springs such as 26, pivoted at 28, are arranged on the front face to register with each location of an electro-magnet in order to urge into their rear inoperative position the plungers 37—7 and consequently the blades 6. When an electro-magnet 27 is energized, the plunger moves against the pressure of spring 26 and causes the blade 6 to project from its housing slot 24, bringing it thus into the path of a stud 5 on the disc positioned in front of the frame.

With the assemblies of discs, electro-magnets and rods described with reference to the preceding figures, provision has been made also, according to another feature of the invention, for the construction of controllers with a plurality of rods that may each be actuated selectively by a chosen electro-magnet. To this end, a setup is carried out similar to that illustraed in Figure 5, provided with four discs 1, 51, 61, and 71, associated with four assemblies similar to that of Figure 4. The driving shaft 2 is common to the four discs and is driven in rotation by any suitable means, for instance through a rope and pulley drive shown at 52 at the end of shaft 2. At one end, the shaft 2 runs in the terminal wall 53 of casing 54. At its other end, it is finished off with a knob 55, against which may bear an actuating rod 56 of which the travel is sufficient to bring about the desired translational movement of shaft 2. A spring 58 holds in the inoperative position the shaft 2 and members that it carries, forced towards the left, the translational movement of the shaft being made against the action of this spring, that ensures the return of the shaft 2 into its inoperative position as soon as the pressure on the part 56 is released.

In Figure 5, the electro-magnet 27 is illustrated in its energized condition. The plunger 7 is attracted and has brought the blade 6 into the path of stop 5 of disc 1; these two parts are locked in the manner shown in Figure 1A, so as to remain engaged, even after the electro-magnet is no longer energized. The stoppage of the disc 1 obviously does not involve the stoppage of the shaft 2, as also the other discs, that keep on revolving. Consequently, any one of the electro-magnets working together with the discs 51, 61, and 71 may be energized independently and lock one of these discs.

The depression of part 56 ensures the driving of the discs and consequently the driving of those rods 3 having a stud 4 of any of discs 1, 51, 61 or 71 in front of a boss (38, 78, etc.) of the rod, the other rods for which there is no stud 4 in front of any of said bosses, remaining stationary. Said driving of rod or rods 3 determines the selected control of parts such as racks 66 and pinions 67 hereunder described and breaks the locking connection between the stops 5 and the blades 6 of the electro-magnet plungers 7. Thus the blades 6 which were in their locking position come back into their inoperative position.

In the assembly illustrated, it is inferred that the displacement of the rods 3 was used for initiating a rotation of rods or parts. The portion to the right of the drawing, outside the controller frame, shows an example of an arrangement for this purpose. The end of each rod 3 actuates a rocker 62 carried by the casing.

This rocker shows a slot 63 in which may slide the nipple 64 of a rod 65 provided with a rack on its end. When the rocker 62 rises, the rod 65 is drawn upwards by an amount proportional to the angle of displacement of the rocker and the rack 66, engaging the pinion 67, causes the turning of the adjusting member associated with the pinion 67 by an amount proportional to the displacement of rod 3 that has been actuated. An extra operation may be carried out, if wished, at the time of pressing down the shaft 2, through the agency of the rocker 68.

By adjusting, in the mounting, the clearances a, b, etc., between the studs 4 of the discs 1, 51 and the bosses 38, 78 etc., of the rods 3, it is apparent that different travels of these rods may be secured through the drive of the corresponding discs, for the same always invariable travel of the shaft 2. In addition, means are provided according to a still further feature of the invention, for obtaining at will different translational movements of a rod 3 by the same disc and this can be done by a combined energization of several electro-magnets.

In Figure 5, for instance, the extension 70 of the plunger 37 of electro-magnet 57 keeps locked in an inoperative position, (Figure 5A) a stop 69, rigid with the rod 3 illustrated, against the action of the spring 71, that has a tendency to cause the rod 3 to turn. On the other hand, the boss cooperating with the disc 1 is formed on this rod by two parts 38 and 48, offset angularly, as shown. If the electro-magnet 27 only is energized, the clearance between the stud 4 and boss 48 is a. The travel of rod 3 when pressure is made on shaft 2 will be equal to the travel of shaft 2 less the clearance b, different from a, existing between the stud 4 and the stop 78. If the electro-magnets 27 and 57 are both energized at the same time, the displacement of plunger 37 will release the extension bar 70 with reference to stop 69 so that the spring 71 may act on the rod 3 and cause it to turn in such a way as to bring the boss 38 in front of the stud 4 (Figure 5B) as soon as, through pressing on the knob 56, the stop 72 at the end of the rod 3 is freed. The travel of rod 3 consequently will be equal to the displacement of the shaft 2 less the clearance c, different from a and b.

Figures 5C, 5D, and 5E give out, in plan view the relative positions of the part 73 rigid with the knob 56 and of the rod 3 throughout this operation. In Figure 5C, the part 73 locks the stop 72 of the shaft 2, and thus prevents the rotation of rod 3. With the slope on 73 making forward, the stop 72 is freed, and the rod 3 turns under the action of the spring 71. When the rod 3 returns to its inoperative position, under the action of the spring 71, that works at the same time under torsional and compressional conditions, the slope of the part 73, returned to the inoperative position, causes the rise of the stop 72, and consequently the return rotation of rod 3.

It is manifest that such a controller is obviously capable of numerous forms of adaptation, according to the arrangement of the circuits of the electro-magnets and that of the parts controlled by the dispacement of the rods.

It is likewise plain that numerous modifications may be introduced in the embodiments described that involve no restricting clauses, without these modifications widening the scope of the invention as defined in accompanying claims.

What I claim is:

1. An electro-mechanical control device for producing predetermined changes of position, comprising a rotary longitudinally shiftable control-shaft, a longitudinally controlled rod, at least one electromagnet, an armature controlled thereby and including a longitudinally extending member adapted to be shifted by the energized electromagnet in a direction parallel to the shaft, a plate coaxial with the shaft and adapted to be driven thereby, at least one radial projection at the periphery of said plate, a projection on each rod adapted to be engaged by a projection on the plate and to be shifted longitudinally thereby when the shaft is shifted axially with the plate, a lateral projection on one side of the plate corresponding to each radial projection and adapted to engage the blade of the corresponding electromagnet in its energized state, and means to impart rotary and longitudinal movement to said control-shaft.

2. An electro-mechanical control device for producing predetermined changes of position, comprising a rotary longitudinally shiftable control-shaft, a longitudinally shiftable controlled rod, at least one electromagnet, an armature controlled thereby and including a longitudinally extending member adapted to be shifted by the energized electromagnet in a direction parallel to the shaft, a plate coaxial with the shaft, means whereby the shaft frictionally drives said plate, at least one radial projection at the periphery of said plate, a projection on each rod adapted to be engaged by a projection on the plate and to be shifted longitudinally thereby when the shaft is shifted axially with the plate, a lateral projection on one side of the plate corresponding to each radial projection and adapted to engage the blade of the corresponding electromagnet in its energized state and means to impart rotary and longitudinal movement to said control-shaft.

3. An electro-mechanical control device for producing predetermined changes of position, comprising a rotary longitudinally shiftable control-shaft, a longitudinally shiftable controlled rod, at least one electromagnet, an armature controlled thereby and including a longitudinally extending member adapted to be shifted by the energized electromagnet in a direction parallel to the shaft, a plate coaxial with the shaft and adapted to be driven thereby, at least one radial projection at the periphery of said plate, a projection on each rod adapted to be engaged by a projection on the plate and to be shifted longitudinally thereby when the shaft is shifted axially with the plate, a lateral projection on one side of the plate corresponding to each radial projection and adapted to snap into engagement with the blade of the corresponding electromagnet in its energized state, and means to impart rotary and longitudinal movement to said control-shaft.

4. An electro-mechanical control device for producing predetermined changes of position, comprising a rotary longitudinally shiftable control-shaft, a longitudinally shiftable controled rod, at least one electromagnet, an armature controlled thereby and including a longitudinally extending member adapted to be shifted by the energized electromagnet in a direction parallel to the shaft, a plate coaxial with the shaft and adapted to be driven thereby, at least one radial projection at the periphery of said plate, a projection on each rod adapted to be engaged by a projection on the plate and to be shifted longitudinally thereby when the shaft is shifted axially with the plate, a lateral projection on one side of the plate in radial alignment with each radial projection and adapted to engage the blade of the corresponding electromagnet in its energized state, and means to impart rotary and longitudinal movement to said control-shaft.

5. An electro-mechanical control device for producing predetermined changes of position, comprising a rotary longitudinally shiftable control-shaft, a longitudinally shiftable rod, at least one electromagnet, an armature controlled thereby and including a longitudinally extending member adapted to be shifted by the energized electromagnet in a direction parallel to the shaft, a plate coaxial with the shaft and adapted to be driven thereby, radial projections irregularly distributed at the periphery of said plate, a projection on each rod adapted to be engaged by a projection on the plate and to be shifted longitudinally thereby when the shaft is shifted axially with the plate, a lateral projection on one side of the plate corresponding to each radial projection and adapted to engage the blade of the corresponding electromagnet in its energized state, and means to impart rotary and longitudinal movement to said control-shaft.

6. An electro-mechanical control device comprising a rotary longitudinally shiftable control-shaft, a plurality of longitudinally shiftable controlled rods arranged in annular formation round said shaft, a plurality of plates fitted on the shaft and each provided with at least one radial and one lateral projection, at least one electromagnet for each rod, means for energizing the same, an armature therefor including a blade longitudinally movable under the action of the energization of the electromagnet, in a plane parallel to the shaft, and adapted to engage in its operative position a projection on the corresponding plate to hold the same against rotation, means whereby the projection held against rotation by the electromagnet armature blade is adapted to urge the corresponding rod forward through a distance equal to that of the allowed shift of the control shaft less a predetermined clearance and means to impart rotary and longitudinal movement to said control-shaft.

7. An electro-mechanical control device comprising a rotary longitudinally shiftable control shaft, a plurality of longitudinally shiftable controlled rods arranged in annular formation round said shaft, a plurality of plates fitted on the shaft and each provided with at least one lateral projection, at least one electromagnet for each rod, means for energizing the same, an armature therefor including a blade longitudinally movable under the action of the energization of the electromagnet in a plane parallel to the shaft and adapted to engage in its operative position the lateral projection on the corresponding plate to hold the same against rotation, a radial projection on said plate corresponding to each lateral projection, means whereby the radial projection corresponding to the lateral projection held against rotation by the electromagnet armature blade is adapted to urge the corresponding rod forward through a distance equal to that of the allowed shift of the control shaft less a predetermined clearance, means for adjusting said clearance and means for imparting rotary and longitudinal movement to said control-shaft.

8. An electro-mechanical control device comprising a rotary longitudinally shiftable control-shaft, a plurality of longitudinally shiftable controlled rods arranged in annular formation round said shaft, a plurality of plates fitted on the shaft and each provided with at least one lateral projection, at least one electromagnet for each rod, means for energizing the same, an armature therefor including a blade longitudinally movable under the action of the energization of the electromagnet in a plane parallel to the shaft and adapted to engage in its operative position the lateral projection on the corresponding plate, a radial projection on said plate corresponding to each lateral projection to hold the same against rotation, means whereby the radial projection corresponding to the lateral projection held against rotation by the electromagnet armature blade is adapted to urge the corresponding rod forward through a distance equal to that of the allowed shift of the control shaft less a predetermined clearance, means whereby the longitudinal shifting of the control shaft returns the electromagnet armature blades into their inoperative position, means yieldingly returning the shaft into its longitudinal starting position and means for imparting rotary and longitudinal movement to said control-shaft.

9. An electro-mechanical control device comprising a rotary longitudinally shiftable control shaft, a plurality of longitudinally shiftable controlled rods arranged in annular formation round said shaft, a plurality of plates fitted on the shaft and each provided with at least one lateral projection, a plurality of electromagnets for each rod adapted to cooperate with different plates, means for energizing the same, an armature therefor including a blade longitudinally movable under the action of the energization of the electromagnet in a plane parallel to the shaft, and adapted to engage in its operative position the lateral projection on the corresponding plate to hold the same against rotation, a radial projection on said plate corresponding to each lateral projection, means whereby the radial projection corresponding to the lateral projection held against rotation by the electromagnet armature blade is adapted to urge the corresponding rod forward through a distance equal to that of the allowed shift of the control shaft less a predetermined clearance, said clearance varying according to the electromagnet energized for controlling a given rod and means to impart rotary and longitudinal movement to said control-shaft.

10. An electro-mechanical control device comprising a rotary longitudinally shiftable control shaft, a plurality of longitudinally shiftable controlled rods arranged in annular formation round said shaft, a plurality of plates fitted on the shaft and each provided with at least one lateral projection, at least one electromagnet for each rod, means for energizing the same, an armature therefor including a blade longitudinally movable under the action of the energization of the electromagnet in a plane parallel to the shaft and adapted to engage in its operative position the lateral projection on the corresponding plate to hold the same against rotation, a radial projection on said plate corresponding to each lateral projection, means whereby the radial projection corresponding to the lateral projection held against rotation by the electromagnet armature blade is adapted to urge the corresponding rod forward through a distance equal to that of the allowed shift of the control-shaft less a predetermined clearance, the clearance with reference to at least one projection varying according to the angular position of the rod considered, means whereby one of the electromagnets controls the rotation of the corresponding rod, means whereby the shifting of the shaft controls the operation of last mentioned means and means to impart rotary and longitudinal movement to said control shaft.

ROBERT GOURDON.

No references cited.